No. 750,094. PATENTED JAN. 19, 1904.
A. H. COWLES.
PROCESS OF SMELTING MATERIALS AND PRODUCING CARBIDS.
APPLICATION FILED OCT. 20, 1903.
NO MODEL. 2 SHEETS—SHEET 1.

Witnesses:
R. A. Baldwin
Julia B. Hill

Inventor:
Alfred H. Cowles,
by Byrnes & Townsend,
Att'ys.

No. 750,094. PATENTED JAN. 19, 1904.
A. H. COWLES.
PROCESS OF SMELTING MATERIALS AND PRODUCING CARBIDS.
APPLICATION FILED OCT. 20, 1903.
NO MODEL. 2 SHEETS—SHEET 2.

Witnesses:
R A Balderson
Julia B. Hill

Inventor:
Alfred H. Cowles,
by Byrnes & Townsend,
Att'ys.

No. 750,094.

Patented January 19, 1904.

UNITED STATES PATENT OFFICE.

ALFRED H. COWLES, OF CLEVELAND, OHIO.

PROCESS OF SMELTING MATERIALS AND PRODUCING CARBID.

SPECIFICATION forming part of Letters Patent No. 750,094, dated January 19, 1904.

Application filed October 20, 1903. Serial No. 177,762. (No model.)

*To all whom it may concern:*

Be it known that I, ALFRED H. COWLES, a citizen of the United States, residing at Cleveland, in the county of Cuyahoga and State of Ohio, have invented certain new and useful Improvements in Processes of Smelting Materials and Producing Carbids, of which the following is a specification.

This invention especially relates to the production of calcium carbid by the use of an electric-resistance furnace.

According to the process the charge—for example, a mixture of lime and carbon—is preheated by passing hot gases through it and is then electrically heated to the required temperature either by passing an electric current through the heated charge or the molten products thereof, acting as a resistance-conductor, or through a separate resistance-conductor in proximity to the charge. The preheating is preferably effected before the charge is introduced into the electric furnace by withdrawing the waste carbon monoxid from the furnace and burning it in the preheating-chamber. Liquid or gaseous fuel from an external source may be used as a substitute for or adjunct to the carbon monoxid, and solid fuel may be employed in the form of an excess of carbon mixed with the charge.

The process may be carried out by apparatus of various forms. For the purpose of illustration I have shown two electric furnaces of types heretofore devised by me, in which the density of the electric current is increased through the resistance-conductor along the path of the current, thereby enabling the temperature of the charge to be gradually raised to a point where the carbid or other product becomes molten and may be tapped from the furnace.

Figure 1:
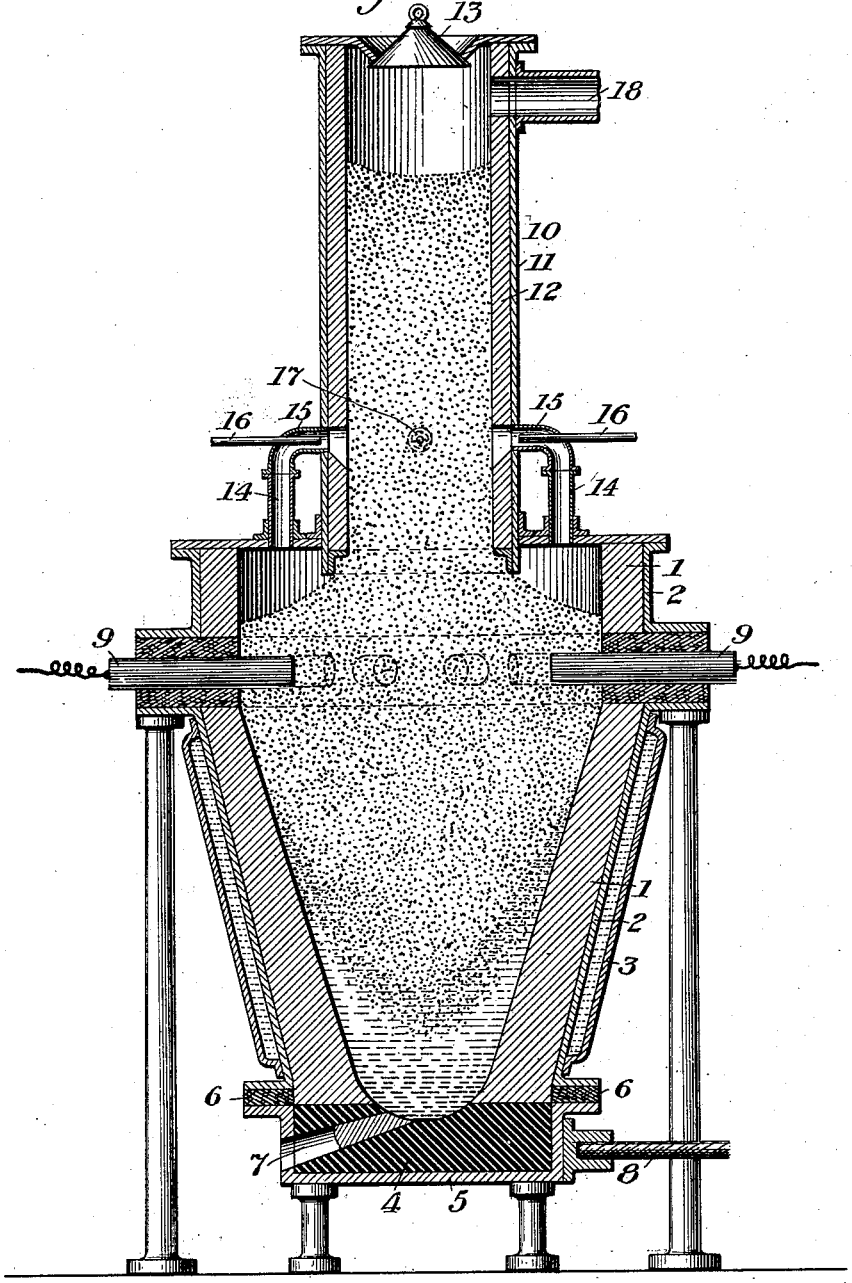
Figure 2:
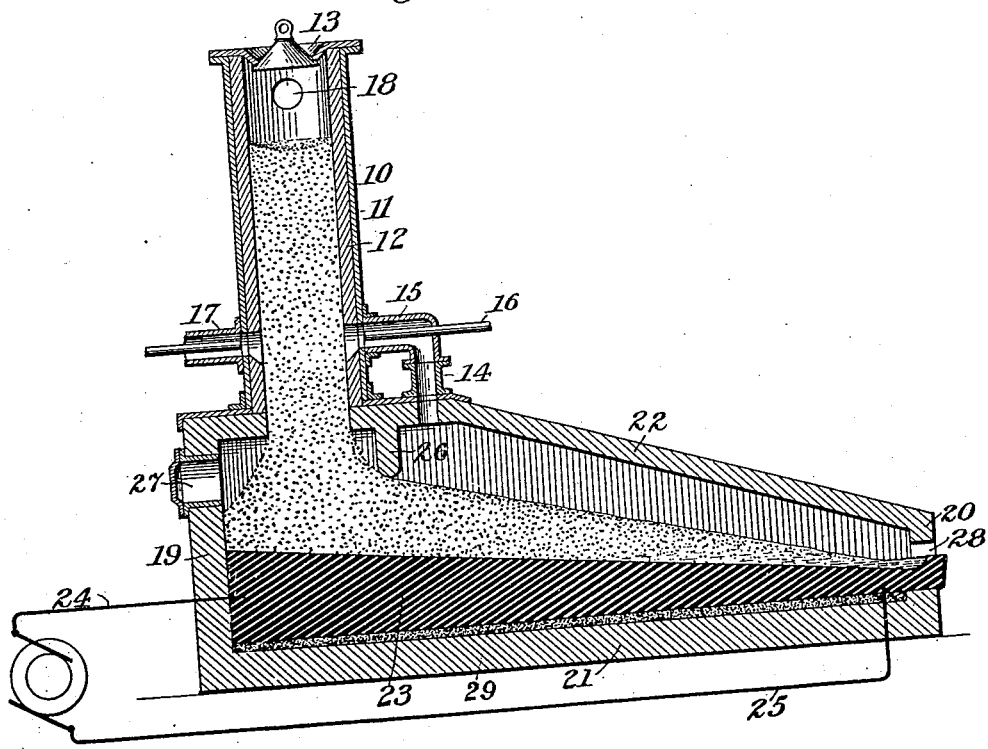

Referring to the accompanying drawings, Figure 1 is a vertical axial section of a stack-furnace in which the cross-section of the working chamber decreases from the upper toward the lower end, and Fig. 2 is a vertical longitudinal section of a furnace having a hearth which serves as a resistance-conductor.

The furnace shown in Fig. 1 is an annular stack, having a body 1 of refractory non-conducting material, such as magnesia fire-brick, inclosed by a casing 2 of iron. The major portion of the body is a downwardly-converging bosh surrounded by a water-jacket 3. The hearth 4 of the furnace consists of a solid mass of carbon set in an iron casing 5, which is insulated from the casing 2 by a refractory layer 6. A tap-hole 7 for the molten products extends through the hearth. One terminal 8 of the source of electric current is secured to the hearth-casing 5, the hearth thus serving as one electrode. A number of radial electrodes 9 of the same polarity, shown as cylindrical carbon rods, pass horizontally through the side walls of the furnace near its top. Supported upon and opening into the upper end of the furnace is the preheating-chamber 10, consisting of a shell 11, of iron, with a lining 12, of refractory material, such as magnesia or siloxicon fire-brick. The upper end of the preheating-chamber has a bell-and-hopper charging mechanism 13. Pipes 14 for withdrawing the combustible gases from the electric furnace extend upward through its top and are connected to burners 15 with air-blast pipes 16, which enter openings in the sides of the preheating-chamber. One or more auxiliary burners 17, supplied by gaseous or liquid fuel from some external source, may also be employed. The products of combustion escape from the upper end of the chamber through a flue 18 and may be used in a hot-blast stove to heat the air for the burners. In operating the furnace, the charge—for example, a mixture of lime and coke—is fed downward through the preheating-chamber and subjected to the action of the hot products of combustion rising from the burners and thence into the electric furnace. The charge may also be preheated by the use of solid rather than gaseous or liquid fuel by mixing an excess of coke with the lime and burning out this excess by air injected through the blast-pipes 16. The ordinary charge of lime and coke has a high electrical resistance, which prevents it from serving as a resistance-conductor until its temperature has been considerably raised. The step of preheating the charge by passing hot gases through it therefore not only effects a saving of electrical energy, but raises or assists in raising the charge to a temperature where it may be employed as a resistance-conductor. When the preheated charge fed into the electric furnace accumulates to a height sufficient to cover the ends of the upper electrodes 9, an electric current is passed between these electrodes and the carbon hearth through the charge, acting as a resistance-conductor. The preheated material is thereby readily raised to the temperature requisite for the production of calcium carbid, and the carbon monoxid evolved by the reaction may thereafter be employed to preheat the charge. It will be seen that the density of the electric current increases along the path of the current through the charge, thereby increasing the amount of heat evolved from its upper toward its lower portion. The temperature of the charge and of the calcium carbid or other product thus rises toward the lower part of the furnace and may be kept at a point sufficiently high to maintain a considerable pool of the molten carbid in the furnace, this pool then serving as a resistance-conductor as well as the charge. The molten carbid is removed through the tap-hole 7, as desired.

The hearth-furnace (shown in Fig. 2) comprises end walls 19 20, floor 21, and roof 22, of refractory non-conducting material, such as fire-brick. The hearth 23 of the furnace is a resistance-conductor, shown as a body of solid carbon, beneath which is a non-heat-conducting layer of powdered charcoal 29 to protect the floor 21. The upper surface of this hearth-conductor slopes downwardly from the receiving to the discharge end of the furnace. One terminal 24 of the source of electric current is connected to the resistance-conductor at the charging end of the furnace and the other terminal 25 is connected to this conductor at the discharge end of the furnace. The preheating-chamber, which is precisely similar to that shown in Fig. 1 and is marked with the same reference-numerals, is supported upon and opens into the charging end of the electric furnace. One or more pipes 14 serve to carry the combustible gases from the electric furnace into the preheating-chamber. A transverse partition 26 depends from the roof of the electric furnace, between the preheating-chamber and the pipe 14, to trap the gases and deliver them to this pipe. The preheated material as it descends from the chamber onto the hearth is distributed over the hearth by a pusher introduced through the door 27 in the end wall 19 of the furnace. An electric current is then passed through the resistance-conductor, heating it ununiformly, the density of the current in the conductor increasing toward the discharge end of the furnace by reason of its diminishing cross-section. The charge is thus gradually heated, as it is moved forward over the hearth, to the required temperature. The carbid or other product may also be brought into a molten condition, so that it will flow out from the furnace through a tap-hole 28. The charge on the hearth is gradually moved downward as the molten product is withdrawn.

I am aware that United States Patent No. 557,057, granted March 24, 1896, to Edward N. Dickerson, discloses a process of producing calcium carbid which consists in feeding the charge into an electric furnace and utilizing the carbon monoxid to heat the mixture as it is being supplied to the furnace. While the present process so far as it employs the waste gases to preheat the charge is included within the terms of this patent, it specifically differs therefrom in that the preheated charge is raised to the temperature required for the reaction by heat from a resistance-conductor, especially a conductor in which the heat increases along the path of the electric current, so that the product may be brought into a molten condition and tapped from the furnace. Furthermore, as stated, the preheating may be effected by the use of gaseous, liquid, or solid fuel from an external source.

I claim—

1. The process of smelting materials, which consists in preheating a charge by passing hot gases through it whereby its electrical conductivity is increased, electrically heating the preheated charge to the required temperature by an electric current passing through a resistance-conductor, and increasing the heat supplied by said resistance-conductor along the path of the electric current, as set forth.

2. The process of smelting materials, which consists in preheating a charge by passing hot gases through it whereby its electrical conductivity is increased, electrically heating the preheated charge to the required temperature by an electric current passing through a resistance-conductor, and increasing the heat supplied by said resistance-conductor along the path of the electric current to a point where the products become molten and may be tapped out, as set forth.

3. The process of producing calcium carbid, which consists in preheating a charge of lime and carbon by passing hot gases through it whereby its electrical conductivity is increased, electrically heating the preheated charge to the required temperature by an electric current passing through a resistance-conductor, and increasing the heat supplied by said resistance-conductor along the path of the electric current, as set forth.

4. The process of producing calcium carbid, which consists in preheating a charge of lime and carbon by passing hot gases through it whereby its electrical conductivity is increased, electrically heating the preheated charge to the required temperature by an electric current passing through a resistance-conductor, increasing the heat supplied by said resistance-conductor along the path of the electric current to a point where the carbid becomes molten, and tapping out the molten carbid, as set forth.

5. The process of producing calcium carbid, which consists in preheating a charge of lime and carbon by passing hot gases through it whereby its electrical conductivity is increased, electrically heating the preheated charge to the required temperature by an electric current passing through a resistance-conductor, increasing the heat supplied by said resistance-conductor along the path of the electric current, and burning the gases produced by the reaction to preheat the charge, as set forth.

6. The process of producing calcium carbid, which consists in preheating a charge of lime and carbon by passing hot gases through it whereby its electrical conductivity is increased, electrically heating the preheated charge to the required temperature by an electric current passing through a resistance-conductor, increasing the heat supplied by said resistance-conductor along the path of the electric current to a point where the carbid becomes molten, tapping out the molten carbid, and burning the gases produced by the reaction to preheat the charge, as set forth.

In testimony whereof I affix my signature in presence of two witnesses.

ALFRED H. COWLES.

Witnesses:
BENJAMIN E. NORGATE,
F. J. DAVIS.